(12) United States Patent  
Miller (10) Patent No.: US 9,200,221 B2  
(45) Date of Patent: Dec. 1, 2015

(54) SYSTEM AND METHOD FOR DRY MIXING A GASIFICATION FEED

(75) Inventor: Gary Daniel Miller, Houston, TX (US)

(73) Assignee: General Electric Company, Schenectady, NY (US)

(*) Notice: Subject to any disclaimer, the term of this patent is extended or adjusted under 35 U.S.C. 154(b) by 1012 days.

(21) Appl. No.: 13/284,842

(22) Filed: Oct. 28, 2011

(65) Prior Publication Data

US 2013/0109564 A1    May 2, 2013

(51) Int. Cl.
*B01J 20/00* (2006.01)
*C10J 3/30* (2006.01)
*C10J 3/50* (2006.01)
*C10K 1/00* (2006.01)
*C10K 1/10* (2006.01)

(52) U.S. Cl.
CPC .. *C10J 3/30* (2013.01); *C10J 3/506* (2013.01); *C10K 1/004* (2013.01); *C10K 1/005* (2013.01); *C10J 2300/0969* (2013.01); *C10J 2300/1678* (2013.01); *C10J 2300/1815* (2013.01); *C10K 1/003* (2013.01); *C10K 1/10* (2013.01); *Y02C 10/08* (2013.01)

(58) Field of Classification Search
USPC ............... 48/61, 76, 77, 71, 72, 73, 200, 201, 48/202, 203, 204, 127.1, 127.9, 197 R
See application file for complete search history.

(56) References Cited

U.S. PATENT DOCUMENTS

| | | | | | |
|---|---|---|---|---|---|
| 2,665,200 | A | * | 1/1954 | Mooson | 48/197 R |
| 3,971,639 | A | * | 7/1976 | Matthews | 48/202 |
| 3,976,442 | A | * | 8/1976 | Paull et al. | 48/197 R |
| 4,145,274 | A | * | 3/1979 | Green et al. | 208/411 |
| 6,084,147 | A | * | 7/2000 | Mason | 588/19 |
| 7,658,776 | B1 | * | 2/2010 | Pearson | 48/62 R |
| 2005/0109603 | A1 | * | 5/2005 | Graham | 201/25 |
| 2006/0105896 | A1 | * | 5/2006 | Smith et al. | 494/7 |
| 2010/0083576 | A1 | * | 4/2010 | Bunk et al. | 48/210 |
| 2010/0121097 | A1 | * | 5/2010 | Sasaki et al. | 560/216 |
| 2011/0154720 | A1 | * | 6/2011 | Bartek et al. | 44/307 |
| 2012/0067702 | A1 | * | 3/2012 | Frey et al. | 198/642 |

* cited by examiner

*Primary Examiner* — Kaity Handal
(74) *Attorney, Agent, or Firm* — Fletcher Yoder, P.C.

(57) ABSTRACT

Present embodiments include systems and methods for reducing variations in a solid feed provided to a gasifier. For example, in an embodiment, a gasification feed vessel includes a solid fuel inlet configured to receive a solid fuel into the gasification feed vessel, a dry mixer configured to dry mix the solid fuel within the feed vessel, a solid fuel outlet configured to deliver a feed of the solid fuel to a gasification system, and a metering device coupled to the solid fuel outlet. The metering device is configured to control an amount of the feed of the solid fuel delivered to the gasification system. The gasification feed vessel is configured to provide the feed of the solid fuel to the gasification system within a desired energy concentration range over time.

10 Claims, 5 Drawing Sheets

SYSTEM AND METHOD FOR DRY MIXING A GASIFICATION FEED

BACKGROUND OF THE INVENTION

The subject matter disclosed herein relates to systems and methods for providing a well-mixed dry feed of fuel to a gasification system.

Synthesis gas, or syngas, is a mixture of hydrogen ($H_2$) and carbon monoxide (CO) that can be produced from carbonaceous fuels. Syngas can be used directly as a source of energy (e.g., in combustion turbines), or can be used as a source of starting materials for the production of other useful chemicals (e.g., methanol, formaldehyde, acetic acid). Syngas is produced in large scale by gasification systems, which include a gasification reactor or gasifier that subjects a carbonaceous fuel, such as coal, and other reactants to certain conditions to produce an untreated or raw syngas. To increase the efficiency of the gasification reaction, the stoichiometric ratio of coal to water within the gasifier is typically maintained within a desired range.

Coal may be collected from various sources, which can lead to different ranks, or qualities, of the coal. Generally, low-rank coals will have higher water content, while high-rank coals have a lower water content. Unfortunately, the variance in water content from one rank of coal to another may reduce the ability to produce syngas using a single set of conditions for all types of coal. For example, in conditions where low-rank coals are used, the estimation of the water content of the coal may not be accurate, which can lead to inefficiencies during gasification of the low-rank coal. That is, a portion of the heat provided to the gasifier for driving the gasification of the carbonaceous fuel within the low-rank coal may be instead used to produce steam from the water of the coal. Further, these coals may have an inconsistent energy content, where the coal may include regions having large amounts of moisture and low fuel content, and other regions having relatively small amounts of moisture and relatively concentrated fuel content. These inconsistencies can reduce the efficiency of the gasifier, reduce the life of the gasifier and associated equipment, and reduce the predictability of the syngas (e.g., the energy content of the syngas).

BRIEF DESCRIPTION OF THE INVENTION

In one embodiment, a system is provided. The system includes a gasification feed vessel. The gasification feed vessel includes a solid fuel inlet configured to receive a solid fuel into the gasification feed vessel and a dry mixer configured to dry mix the solid fuel within the feed vessel. The dry mixer includes a gas inlet configured to deliver a stream of gas into the gasification feed vessel, or a mechanical agitator, or a combination thereof. The gasification feed vessel also includes a solid fuel outlet configured to deliver a feed of the solid fuel to a gasification system and a metering device coupled to the solid fuel outlet. The metering device is configured to control an amount of the feed of the solid fuel delivered to the gasification system. The gasification feed vessel is configured to provide the feed of the solid fuel to the gasification system within a desired energy concentration range over time.

In another embodiment, a system is provided. The system includes a gasification feed hopper having a solid fuel inlet configured to receive a solid fuel into the gasification feed hopper and a dry mixer configured to dry mix the solid fuel within the gasification feed hopper. The dry mixer includes a gas inlet configured to deliver a stream of gas into the gasification feed hopper, or a mechanical agitator, or a combination thereof. The gasification feed hopper also includes a solid fuel outlet configured to deliver a feed of the solid fuel to a gasification system. The dry mixer is configured to reduce variations in an energy concentration in the feed of the solid fuel provided to the gasification system.

In a further embodiment, a method is provided. The method includes receiving a solid fuel within a gasification feed vessel, dry mixing the solid fuel within the gasification feed vessel using a mechanical agitator or a stream of gas provided to the interior of the gasification feed vessel, or a combination thereof, and delivering a feed of the solid fuel to a gasification system within a desired energy concentration range over time.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements.

The terms "comprising," "including," and "having" are intended to be inclusive and mean that there may be additional elements other than the listed elements.

As noted, in embodiments where the solid fuel used for syngas production includes a low-rank coal, the solid fuel (i.e., coal) may have unpredictable amounts of moisture, and may have anisotropic concentrations of carbonaceous fuel. This can lead to large temperature variations or other variations within a gasifier and associated equipment, which calls for robust process control systems. To reduce variations such as these, the present embodiments are generally directed toward a dry mixed gasification feed vessel, such as a gasification feed hopper, which is configured to deliver a well-mixed, consistent feed of a solid fuel, such as coal. The gasification feed vessel, in certain embodiments, may include a dry mixer that is configured to reduce variations in the solid fuel by dry mixing the solid fuel within the vessel. As defined herein, dry mixing includes processes in which a solid, such as a solid fuel (e.g., coal) is agitated without adding a substantial amount of moisture. For example, dry mixing in accordance with present embodiments may be performed without slurrying the solid fuel with water or another liquid. As discussed in further detail below, dry mixing may be accomplished using gas flows that are substantially free of moisture, or using mechanical agitation features, such as a screw conveyor. As defined herein, substantially free of moisture denotes mixtures, such as gaseous mixtures, which include approximately 5% or less of water or water vapor. As an example, dry mixing with gas may include dry mixing using air, nitrogen, carbon dioxide, helium (He), argon (Ar), neon (Ne), or any combination thereof. The particular gas or gas mixture used for the dry mixing embodiments described herein may be determined based on plant availability, proximity to a gaseous source, and so on. After dry mixing within the gasification feed vessel, the solid fuel may be delivered to a downstream system, such as a gasification system, in a reliable manner. Indeed, by dry mixing the solid fuel, the gasification feed vessel may behave as a continuously stirred tank reactor having a homogenous (e.g., well-mixed) mixture of solid fuel, rather than a plug flow reactor having varying amounts of solid fuel. Thus, a well-mixed solid fuel feed in accordance with present embodiments may include a feed having a relatively consistent amount of solid fuel, which may be measured by an energy concentration of the feed, as described in detail below.

Figure 1:
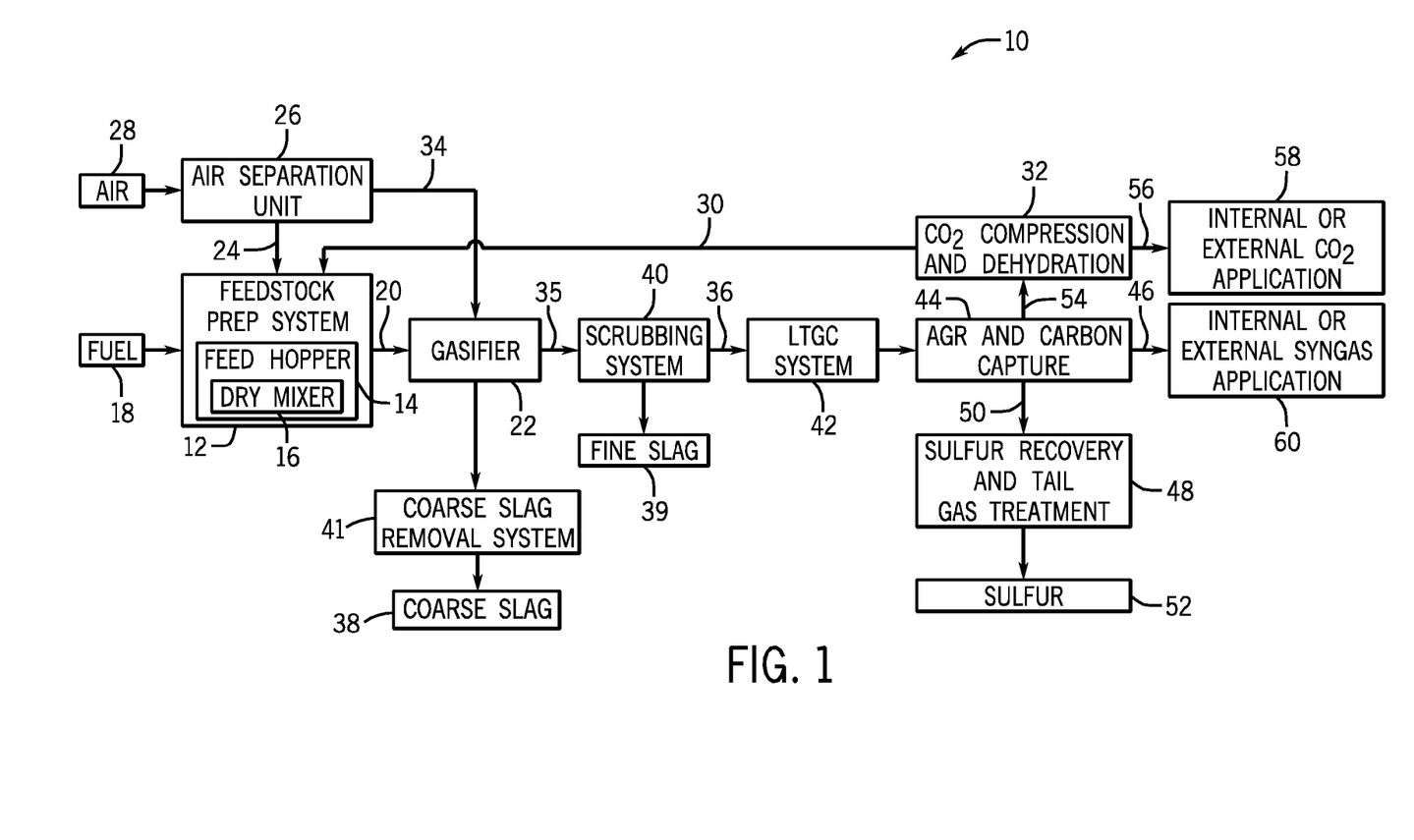
FIG. 1 is block diagram illustrating an embodiment of a syngas production system having a feedstock preparation system with a dry, backmixed feed hopper in accordance with present embodiments.

FIG. 1 illustrates a block diagram of a gasification and treatment system 10 having a feedstock preparation system 12 that includes a dry mixed gasification feed vessel or feed hopper 14 in accordance with the disclosed embodiments. According to certain aspects of the present embodiments discussed in further detail below, the feed hopper 14 includes a dry mixer 16, such as a mechanical agitator or a gas inlet, for generating a substantially homogenous mixture of solid fuel within the feed hopper 14. In addition to the feedstock preparation system 12, the system 10 includes, among other features, areas for generating syngas as well as treating syngas for various end uses.

Elements of the system 10 may include a carbonaceous fuel source 18, such as a solid coal feed, which may be utilized as a source of energy and/or for the production of syngas or substitute natural gas (SNG). The fuel source 18 may include coal, petroleum coke, biomass, wood-based materials, agricultural wastes, tars, coke oven gas and asphalt, or other carbon containing items. The solid fuel of the fuel source 18 may be passed to the feedstock preparation system 12. The feedstock preparation system 12 may include several subsystems. For example, the preparation system 12 may include, by way of example, a grinder, chopper, mill, shredder, pulverizer, or other feature for resizing or reshaping the fuel source 18 by chopping, milling, shredding, pulverizing, briquetting, or pelletizing the fuel source 18 to generate feedstock. In accordance with present embodiments, no liquid (e.g., water) is added to the fuel source 18 in the feedstock preparation system 12, thus yielding dry feedstock.

The fuel source, as noted above, may be dry mixed within the feed hopper 14 of the feedstock preparation system 12 to produce a substantially homogenous mixture of solid fuel within the feed hopper 14. The feed hopper 12 is configured to deliver a feed of solid fuel 20 to a gasifier 22 disposed downstream from the feedstock preparation system 12. The feed of solid fuel 20 may include the solid fuel and other components, such as a carrier gas (e.g., nitrogen ($N_2$) or carbon dioxide ($CO_2$), fluxants, additives, catalysts). Further, because the fuel source 18 is dry mixed within the feed hopper 14, the feed of solid fuel 20 may have an energy concentration (i.e., a stored energy from the fuel of the feed of the solid fuel 20) that is within a desired concentration range. For example, the feed hopper 14 may be configured to deliver the feed of the solid fuel 20 at a substantially constant and/or uniform energy concentration. As defined herein, a substantially constant energy concentration is denoted as a concentration of stored energy, as measured in energy units per mass of solid feed, that is maintained within approximately 50 kilojoules (kJ) per kilogram (kg), or approximately 115 British thermal units (BTU) per pound (lb), of a desired energy concentration. Therefore, in accordance with present embodiments, the feed hopper 14 may be configured to deliver the feed of the solid fuel 20 at an energy concentration that is maintained within between approximately 50 kJ/kg of a desired energy concentration of the feed of solid fuel 20, such as between approximately 50 kJ/kg and 0 kJ/kg, 40 kJ/kg and 10 kJ/kg, or 30 and 20 kJ/kg of a desired energy concentration.

The dry mixer 16, as noted above, may include a mechanical agitator, such as a screw conveyor, or may include a gas inlet configured to introduce a gas into the feed hopper 14. In some embodiments, the dry mixer 16 may include both the mechanical agitator and the gas inlet. The gas may flow through the gas inlet and may agitate the solid fuel within the feed hopper to fluidize the feed hopper 14. Thus, the feed of solid fuel 20, in some embodiments, may be a fluidized particulate flow containing a carrier gas. As discussed herein, a fluidized particulate flow is intended to denote a stream that contains particulates (e.g., particulates of a solid fuel) entrained within a gaseous flow, and which is substantially free of liquid (e.g., water). In other words, a fluidized particulate flow in accordance with present embodiments denotes a flow containing solid fuel suspended within a carrier gas (e.g., $CO_2$, $N_2$), rather than a liquid.

In addition, it may be desirable to use a gas that is capable of inhibiting ignition/combustion of the solid fuel, such as $N_2$ and/or $CO_2$. Thus, in accordance with certain embodiments, the dry mixer 16 may receive a flow of $N_2$ 24 from an air separation unit (ASU) 26 configured to separate the $N_2$ from air 28. Additionally or alternatively, the dry mixer 16 may receive a flow of compressed $CO_2$ 30 from a $CO_2$ compression and dehydration system 32, as discussed below. Embodiments relating to the dry mixer 16 and its integration with the feed hopper 14 are discussed in further detail with respect to FIGS. 2-5.

As noted, the flow of solid fuel 20 is provided to the gasifier 22, such as a gasifier with a quench cooler or radiant syngas cooler, wherein the gasifier 22 may convert the solid fuel into a combination of CO and $H_2$, i.e., syngas. This conversion may be accomplished by subjecting the solid fuel to a controlled amount of steam and oxygen at elevated pressures, e.g., from approximately 20 bar to 85 bar, and temperatures, e.g., approximately 700° C.-1600° C., depending on the type of gasifier utilized. The gasification process may also include the solid fuel undergoing a pyrolysis process, whereby the feedstock is heated. Temperatures inside the gasifier 22 may range from approximately 150° C. to 700° C. during the pyrolysis process, depending on the fuel source 18 utilized to generate the flow of the solid fuel 20. The heating of the feedstock during the pyrolysis process may generate a solid, e.g., char, and residue gases, e.g., CO, $H_2$, and $N_2$.

A combustion process may then occur in the gasifier 22. To aid with this combustion process, a stream of oxygen 34 may be supplied to the gasifier 22 from the ASU 26. As generally noted above, the ASU 26 may operate to separate the air 28 into component gases by, for example, distillation techniques that may be cryogenic or may utilize pressure swing adsorption (PSA). Accordingly, the gasifier 22 receives the oxygen 34 from the ASU 26 for combustion purposes. The combustion may include introducing oxygen 34 to the char and residue gases so that the char and residue gases may react with the oxygen 34 to form $CO_2$ and CO, thus providing heat for the subsequent gasification reactions. The temperatures during the combustion process may range from approximately 700° C. to 1600° C. Next, steam may be introduced in a controlled amount into the gasifier 22 during a gasification step. The char may react with the $CO_2$ and steam to produce CO and $H_2$ at temperatures ranging from approximately 800° C. to 1100° C. In essence, the gasifier 22 utilizes steam and oxygen to allow some of the feedstock to be combusted to produce $CO_2$ and energy, thus driving a main reaction that converts further feedstock to $H_2$ and additional CO.

In embodiments where an uneven energy concentration of the solid fuel is received by the gasifier 22, the gasification step may lead to very high temperatures within the gasifier 22, which may cause the gasifier 22 to be shut down by various process control features. Such a shutdown may lead to decreased throughput and a loss of overall energy production or SNG production. Therefore, the flow of solid fuel 20 produced in accordance with the present embodiments may enable substantially continuous operation of the gasifier 22 and a reduced possibility of gasifier shutdown by reducing variations in the overall energy concentration of the solid fuel 20. Thus, the present embodiments may provide an advantage of a relatively steady production of syngas by the gasifier 22.

The syngas produced within the gasifier 22 may include approximately 85% of CO and $H_2$ (syngas substituents), as well as $CO_2$, $CH_4$, and other acid and/or sulfur-containing gases. In certain embodiments, this syngas mixture may be referred to as a raw or untreated syngas 35. The gasifier 22 may also generate waste, such as coarse slag 38, which in some embodiments may be a wet ash material. The slag 38 may be removed from the gasifier 22 by a coarse slag removal system 41. The coarse slag 38 may be disposed of, for example, as road base, or as another building material. Additionally, a scrubbing subsystem 40 may clean the untreated syngas 35 by removing any particulate matter from the untreated syngas 35, such as the wet ash, to produce a scrubbed syngas 36.

The scrubbed syngas 36 may then be sent to various treatment systems, such as a low temperature gas cooling (LTGC) unit 42, where the temperature of the scrubbed syngas 36 is reduced. In some embodiments, the scrubbed syngas 36 is cooled so that a downstream acid gas removal (AGR) and carbon capture system 44 may more effectively treat the scrubbed syngas 36. For example, in embodiments where the scrubbed syngas 36 is cooled, gases such as $H_2S$ and $CO_2$ may have higher solubilities in the solvent(s) used to remove them from other syngas components (i.e., CO and $H_2$). In certain embodiments, at least a portion of the $CO_2$ which is dissolved may eventually be used for the dry mixing within the feed hopper 14. The LTGC unit 42 may cool the scrubbed syngas 36 in a variety of processes, including heat exchange, gas expansion, and so forth.

Subsequent to cooling, the stream of cooled scrubbed syngas 36 is sent to the AGR and carbon capture system 44. The AGR portion of the AGR and carbon capture system 44 may scrub the cooled scrubbed syngas 36 to remove various gases and/or elements. For example, acid gases such as HCl, HF, COS, HCN, and $H_2S$ may be removed from the cooled scrubbed syngas 36 to generate a stream of treated syngas 46 (e.g., syngas substantially without sulfur). Additionally, the AGR unit 44 may transmit the removed gases and/or elements of the cooled scrubbed syngas 36 (e.g., the HCl, HF, COS, HCN, and $H_2S$) to a sulfur recovery and tail gas treatment system 48. In the illustrated embodiment, the AGR unit 44 may provide acid gas 50 to the SRU 48, which may separate sulfur 52 using, for example, a Claus reactor.

The carbon capture portion of the AGR and carbon capture system 44, as noted above, may dissolve and remove a large portion of the $CO_2$ contained within the cooled scrubbed syngas 36 to produce a stream of $CO_2$ 54. The stream of $CO_2$ 54 is provided to the $CO_2$ compression and dehydration system 32, which is generally configured to remove moisture from the stream of $CO_2$ 54 and generate a pressurized $CO_2$ 56. In accordance with certain presently disclosed embodiments, the pressurized $CO_2$ 56 may be sent to the feed hopper 14 as the stream of $CO_2$ 30 for dry mixing and/or to another internal or external application 58. The treated syngas 46 is provided to an internal or external syngas application 60, such as one or more gas turbines, methanation systems to generate SNG, external chemical plants, and so on.

Figure 2:
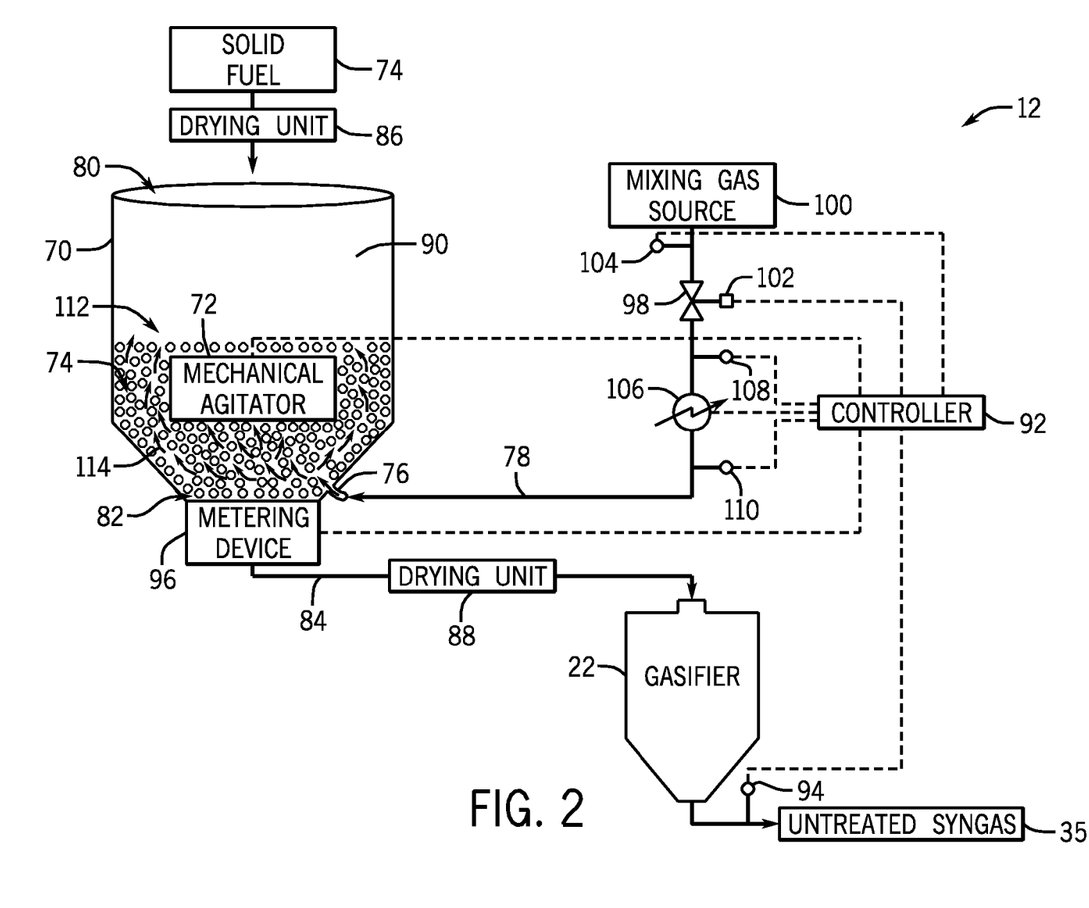
FIG. 2 is a schematic illustration of an embodiment of the feedstock preparation system of FIG. 1 having a gasification feed vessel with a mechanical agitator and a gas inlet, and a controller configured to control the operation of the mechanical agitator and a flow of gas through the gas inlet in response to feedback received from a series of sensors.

As noted above, the amount and quality of the syngas produced by the system 10 may at least partially depend on the ability of the feedstock preparation system 12 to reliably feed solid fuel to the gasifier 22. Again, the present embodiments provide gasification feed vessels, such as the feed hopper 14, having the dry mixer 16 for generating a feed of solid fuel having a uniform, substantially constant energy content. An embodiment of the feedstock preparation system 12 is illustrated in FIG. 2. Specifically, the feedstock preparation system 12 of FIG. 2 includes, among other features, a gasification feed vessel 70 having a mechanical agitator 72 configured to dry mix a solid fuel 74 (e.g., particles of the carbonaceous fuel source 18) and a gas inlet 76 configured to receive a flow of gas 78 for dry mixing (e.g., fluidizing) the solid fuel 74 (e.g., particulate fuel). The gasification feed vessel 70 also includes a solid fuel inlet 80 configured to receive the solid fuel 74 into the gasification feed vessel 70, and a solid fuel outlet 82 configured to deliver a feed of the solid fuel 84 (e.g., a fluidized particulate fuel flow) from the gasification feed vessel 70. Again, the gasification feed vessel 70, in combination with the flow of gas 78 and the mechanical agitator 72, is configured to deliver the feed of the solid fuel 84 at a substantially constant (e.g., uniform) energy content via a combination of dry mixing, agitation, fluidization, metering, or any combination thereof.

The solid fuel 74 may be received into the gasification feed vessel 70 from a first drying unit 86 configured to dry the solid fuel 74. For example, the first drying unit 86 may perform heating, gas stripping, or any other such technique known in the art for removing moisture from a solid. It may be desirable to dry the solid fuel 74 before provision to the gasification feed vessel 70 so as to facilitate dry mixing by the mechanical agitator 72 and/or the flow of gas 78. Additionally or alternatively, a second drying unit 88 may be provided to dry the feed of the solid fuel 84 using the same or different drying techniques as the first drying unit 86. Drying the feed of the solid fuel 84 before provision to the gasifier 22 may be desirable to reduce inconsistencies in the moisture content of the feed of the solid fuel 84, for example due to fresh exposure of pockets of moisture in the solid fuel 74 during dry mixing within the gasification feed vessel 70.

Figure 5:
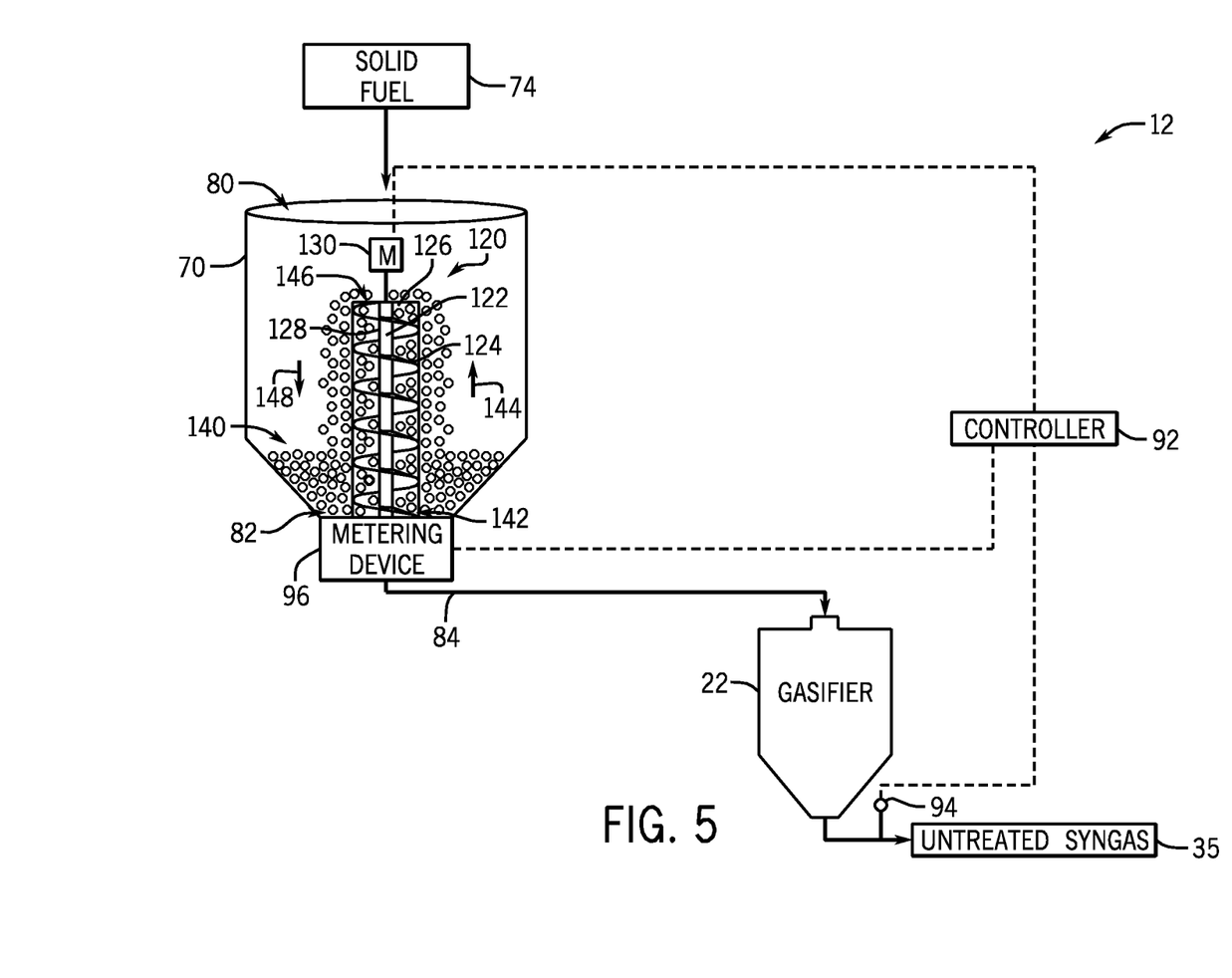
FIG. 5 is a schematic illustration of an embodiment of the feedstock preparation system of FIG. 1 having a gasification feed vessel with a screw conveyor configured to dry mix solid fuel within the gasification feed vessel.

As illustrated, the mechanical agitator 72 is positioned within an interior 90 of the gasification feed vessel 70 to dry mix the solid fuel 74 within the gasification feed vessel 70. The mechanical agitator 72 may include one or more screw conveyors as illustrated in FIG. 5, or may be a track-type conveyor, a series of fan-like or blade-like rotating members, a dry blender (e.g., to shake and blend the solid fuel 74 and any other solids), or similar agitation features. The mechanical agitator 72, as illustrated, is operatively coupled to a controller 92, which may be configured to control a speed of the mechanical agitator 72 (e.g., via a motor), a direction of rotation of the mechanical agitator 72, or similar operational parameters. The controller 92 may perform such adjustments to the mechanical agitator 72 and, where appropriate, the flow of gas 78 in response to a feedback indicative of changes in the untreated syngas 35 produced by the gasifier 22. For example, as illustrated, the controller 92 may be communicatively coupled to a first transducer or sensor 94 configured to perform measurements on the untreated syngas 35. The measurements may include a temperature of the untreated syngas 35, an amount of the untreated syngas 35 generated over time, a pressure of the untreated syngas 35, an amount of slag formed or collected, a composition of the untreated syngas 35, variation in sensed parameters such as sudden spikes in temperatures and/or pressures, or any indication of the efficiency of the gasification reactions performed by the gasifier 22. Thus, the system 10 may include any number of sensors disposed along conduits, within the gasifier 22, on the gasifier 22, or anywhere as may be desirable for measuring the efficiency of the gasification reaction within the gasifier 22, the quality of the produced syngas, or similar metrics. Thus, the controller 92 in accordance with present embodiments may perform adjustments to the dry mixer 16, as discussed in further detail below, in response to any such measurements or feedback. In other words, the controller 92 may adjust the dry mixer 16, as discussed further below, in response to feedback indicative of uneven energy concentrations of the feed of the solid fuel 84. The first sensor 94 may send one or more signals to the controller 92 indicative of the measurements. Thus, the controller 92 may include any processing-based machine capable of performing diagnostics and operational control, such as a distributed control system, an on-board controller, a workstation computer, or any such machine having one or more processors capable of performing the operations described herein. For example, the controller 92 may include one or more data storage and/or accessing devices configured to store and/or access one or more routines for performing control operations with respect to the mechanical agitator 72, the flow of gas 78, and other operations, such as the control of a metering device 96, as discussed below.

As noted, the controller 92 is configured to adjust the mechanical agitator 72 by controlling, for example, a motor of the agitator 72. To control the flow of the gas 78, the controller 92 may be operatively connected to a flow control valve 98 disposed between the gasification feed vessel 70 and a source of the flow of gas 78, which is a mixing gas source 100. In accordance with certain embodiments, the mixing gas source may include the ASU 26 or the $CO_2$ dehydration and compression section 32 of system 10 (FIG. 1). While certain of the embodiments described herein present the mixing gas source 100 in the context of including the ASU 26 and/or AGR/carbon capture system 44, any gas capable of agitating or otherwise mixing the solid fuel 74 while preventing inadvertent combustion is presently contemplated. For example, the flow of gas 78 may include any inert or non-oxidizing gas, such as a noble gas or other gaseous mixtures. Thus, the mixing gas source 100 may be any source of gas, such as any pressurized vessel capable of holding and/or delivering the flow of gas 78 through the flow control valve 98.

In one non-limiting example, the controller 92 may adjust a position of an actuator 102 of the flow control valve 98 to adjust a flow rate of the flow of gas 78. The controller 92 may perform such an adjustment in response to feedback received from the first transducer or sensor 94, or in response to feedback received from a second sensor 104. For example, the feedback received as one or more signals from the second transducer or sensor 104 may include, but is not limited to, signals indicative of a pressure or a flow rate of the flow of gas 78 just downstream of the mixing gas source 100, or further downstream, such as just prior to encountering the gas inlet 76.

Additionally or alternatively, the controller 92 may be operatively coupled to a heat exchanger 106 configured to transfer thermal energy to the flow of gas 78. As a non-limiting example, the heat exchanger 106 may transfer heat from steam, heated syngas, heated substitute natural gas, combustion exhaust, or another heat source to the flow of gas 78. It may be desirable to heat the flow of gas 78 to provide enhanced dry mixing and drying of the solid fuel 74 within the gasification feed vessel 70.

The controller 92 may perform heating adjustments by adjusting one or more operational parameters (e.g., heat transfer rates, exposure times) of the heat exchanger 106 in response to feedback received from either or both of third and fourth sensors 108, 110. The feedback received from the third and fourth sensors 108, 110 may include, but is not limited to, temperature, flow, or pressure-related information, or any combination thereof. By way of a non-limiting example, the controller 92 may calculate a pressure or temperature gradient between the third and fourth sensors 108, 110 and make adjustments to the heat exchanger 106 as appropriate. It may be desirable to maintain a temperature of the flow of the gas 78 within a certain range, such as between approximately 20 and 140° C. As a non-limiting example, the temperature of the gas 78 may be maintained within approximately 20 to 60° C. for purposes of mixing the solid fuel 74, or within approximately 40 to 140° C. for purposes of mixing and drying the solid fuel 74. Thus, the temperature of the flow of gas 78 may be maintained between approximately 20 and 140, 30 and 130, 40 and 120, 50 and 110, 60 and 100, or 70 and 90° C.

As illustrated, during operation, the flow of gas 78, which may include $N_2$, $CO_2$, a combination thereof, or any gas or gas mixture that is capable of inhibiting the combustion of the solid fuel 74 during dry mixing, may enter the interior 90 of the gasification feed vessel 70 (e.g., after heating). The flow of gas 78 may then flow within a bed of solid fuel 112, as illustrated by arrows 114. In certain embodiments, the flow of gas 78 may dry mix the solid fuel 74 (e.g., particulate fuel) in such a way that the solid fuel 74 becomes fluidized within the gasification feed vessel 70. That is, the solid fuel 74 (e.g., particulate fuel) is able to flow in a fluid-like manner (e.g., multiphase flow of fuel particles in carrier gas) out of the solid fuel outlet 82 of the gasification feed vessel 70.

Thus, in certain embodiments, the flow of gas 78 may be used to agitate and fluff the solid fuel 74. For example, fluffing the solid fuel 74 may include, but is not limited to, permeating the pores of the solid fuel 74 with the flow of gas 78. The flow of gas 78 may permeate the solid fuel 74 and entrain at least a portion of the moisture that may be contained within the solid fuel 74. Therefore, the flow of gas 78 may act as a stripping gas to remove moisture from the solid fuel 74. Additionally, permeation of the solid fuel 74 by the flow of gas 78 may aid in fluidizing the solid fuel 74, grinding or breaking up of the solid fuel 74, and dry mixing the solid fuel 74. The flow of gas 78 may also expand the solid fuel 74 (e.g., by expanding pore size) to facilitate further drying, and may also expand the solid fuel 74 to an extent where the solid fuel 74 breaks into finer pieces. Accordingly, the flow of gas 78 may break up and mix the solid fuel 74 to reduce pockets of high energy content of the solid fuel 74, which may enhance the uniformity of the energy content of the feed of the solid fuel 84 provided to the gasifier 22.

The present embodiments also provide the metering device 96, which is coupled to the gasification feed vessel 70 (e.g., to the solid fuel outlet 82) and is configured to control an amount of the solid fuel 74 exiting the gasification feed vessel 70. Generally, the metering device 96 is configured to control a rate at which the feed of the solid fuel 84 is provided to downstream systems, such as the gasifier 22. In one non-limiting example, as noted above, dry mixing the solid fuel 74 with the flow of gas 78 may fluidize the solid fuel 74. Further, the mechanical agitator 72 may control the amount of solid fuel 74 that is able to reach the solid fuel outlet 82, which may provide an even flow of the solid fuel 74 out of the solid fuel outlet 82 and to the metering device 96. In other words, the flow of gas 78 and/or the mechanical agitator 72 may enable a consistent flow of solid fuel 74 to the metering device 96. In turn, the metering device 96, which may be operatively coupled to the controller 92, may control the amount of the feed of the solid fuel 84 provided to the gasifier. In this way, the metering device 96, coupled with the dry mixing mechanical agitator 72 and/or flow of gas 78, may provide the feed of the solid fuel 84 to the gasifier 22 at an energy concentration maintained within a desired range.

As a non-limiting example, the controller 92, in response to feedback received from any of the sensors 94, 104, 108, 110, may adjust a rate at which the metering device 96 passively or actively allows the solid fuel 74 to be delivered to the gasifier 22. Thus, the metering device 96 may include any device capable of controlling a solid flow (e.g., a fully solid flow or a fluidized flow having particulate in carrier gas), such as one or more valves (e.g., a rotating valve) or a solids pump. In one embodiment, the metering device 96 may include a may be a Posimetric® pump made by General Electric Company of Schenectady, N.Y. The term "posimetric" may be defined as capable of metering (e.g., measuring an amount of) and positively displacing (e.g., trapping and forcing displacement of) the solid fuel 74 (and other solids). The posimetric pump is able to meter and positively displace a defined volume of the solid fuel 74. The posimetric pump path may have an elliptical shape (e.g., circular or curved shape). In some embodiments, the metering device 96 may include any one or a combination of posimetric displacing devices.

Figure 3:
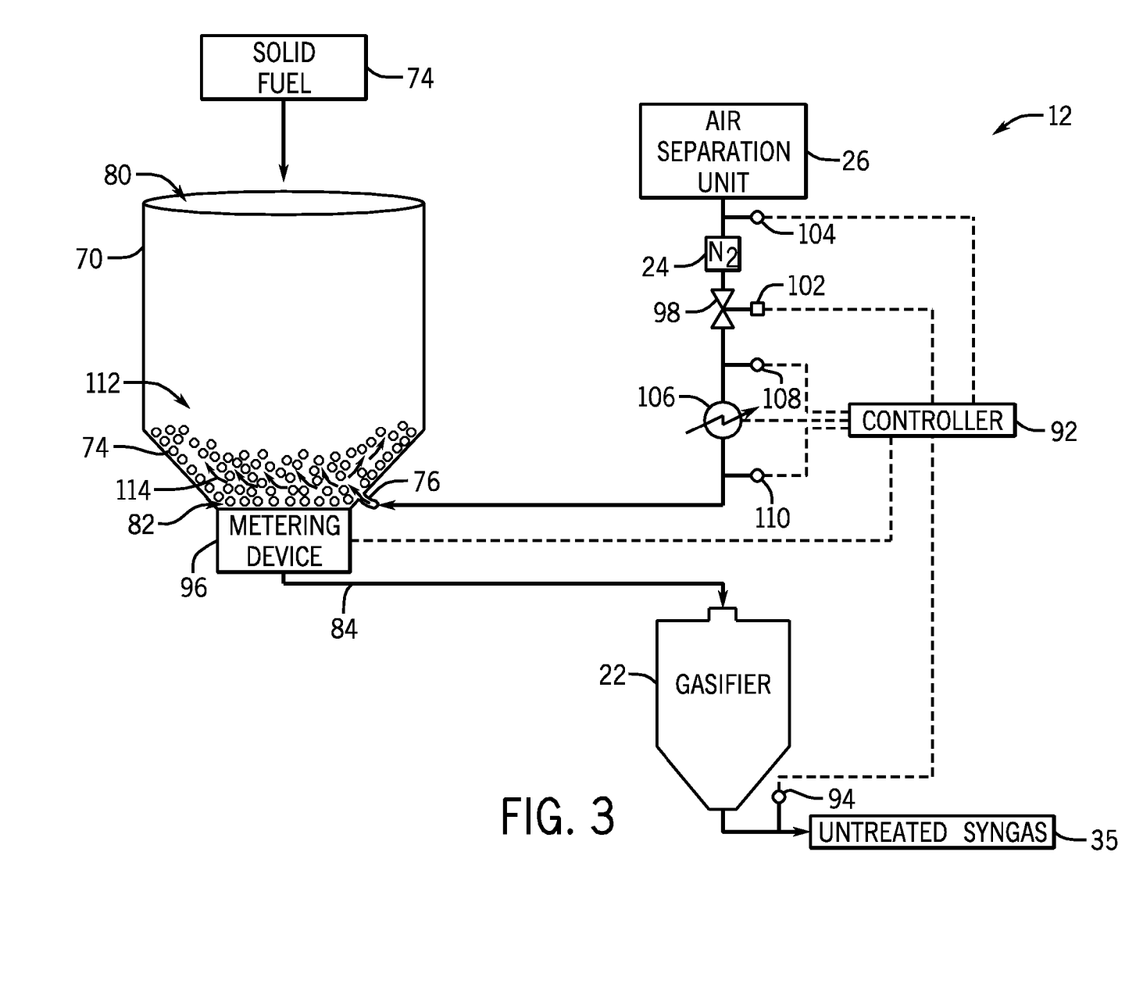
FIG. 3 is a schematic illustration of an embodiment of the feedstock preparation system of FIG. 1 having a gasification feed vessel with a gas inlet configured to receive nitrogen from the air separation unit of the syngas production system of FIG. 1.

Another embodiment of the feedstock preparation system 12 is illustrated in FIG. 3, which depicts an embodiment of the gasification feed vessel 70 having the gas inlet 76 for dry mixing the solid fuel 74. As illustrated, the gasification feed vessel 70 is coupled to the air separation unit 26 via one or more conduits. Therefore, the flow of gas 78 depicted in FIG. 2 includes nitrogen 24 that has been separated by the ASU 26 from other gaseous components of the air 28, such as oxygen and water vapor. In accordance with present embodiments, the gasification feed vessel 70 utilizes the flow of gas 78 to deliver the feed of the solid fuel 84 at a substantially constant energy concentration (i.e., the feed of the solid fuel 84 has a substantially uniform energy content).

As discussed above with respect to FIG. 2, the flow of gas 78, which in the embodiment of FIG. 3 includes nitrogen 24, may be heated at the heat exchanger 106. Again, the temperature to which the nitrogen 24 is heated may depend on measurements collected by any one or a combination of the sensors 94, 104, 108, 110 and monitored by the controller 92. The controller 92 may make adjustments to the flow rate of the nitrogen 24, the temperature of the nitrogen 24, the pressure of the nitrogen 24, or any combination thereof, in response to the monitored parameters of the system 10 (e.g., feedback from sensors 94, 104, 108, 110). As generally noted above, the nitrogen 24 may be heated to facilitate agitation and fluffing of the solid fuel 74 within the gasification feed vessel 70.

The nitrogen 24 may also serve as a flame-retarding, combustion-inhibiting carrier gas for the solid fuel 74 in the feed 84. Therefore, the feed of the solid fuel 84 may be a substantially homogeneous and fluidized flow including the solid fuel 74, any additives that may be added to the gasification feed vessel 70 in addition to the solid fuel 74, and the nitrogen 24. The nitrogen 24, when mixed with the solid fuel 74, may thus serve to provide the feed of the solid fuel 84 at a substantially constant flow rate, a substantially constant energy concentration, an energy concentration maintained within a desired range, or any combination thereof, to the gasifier 22 or another downstream system or process. Thus, the controller 92 may perform adjustments to the flow of gas 78 to maintain the gasification feed vessel 70 (i.e., the solid fuel 74) in a fluidized state.

Figure 4:
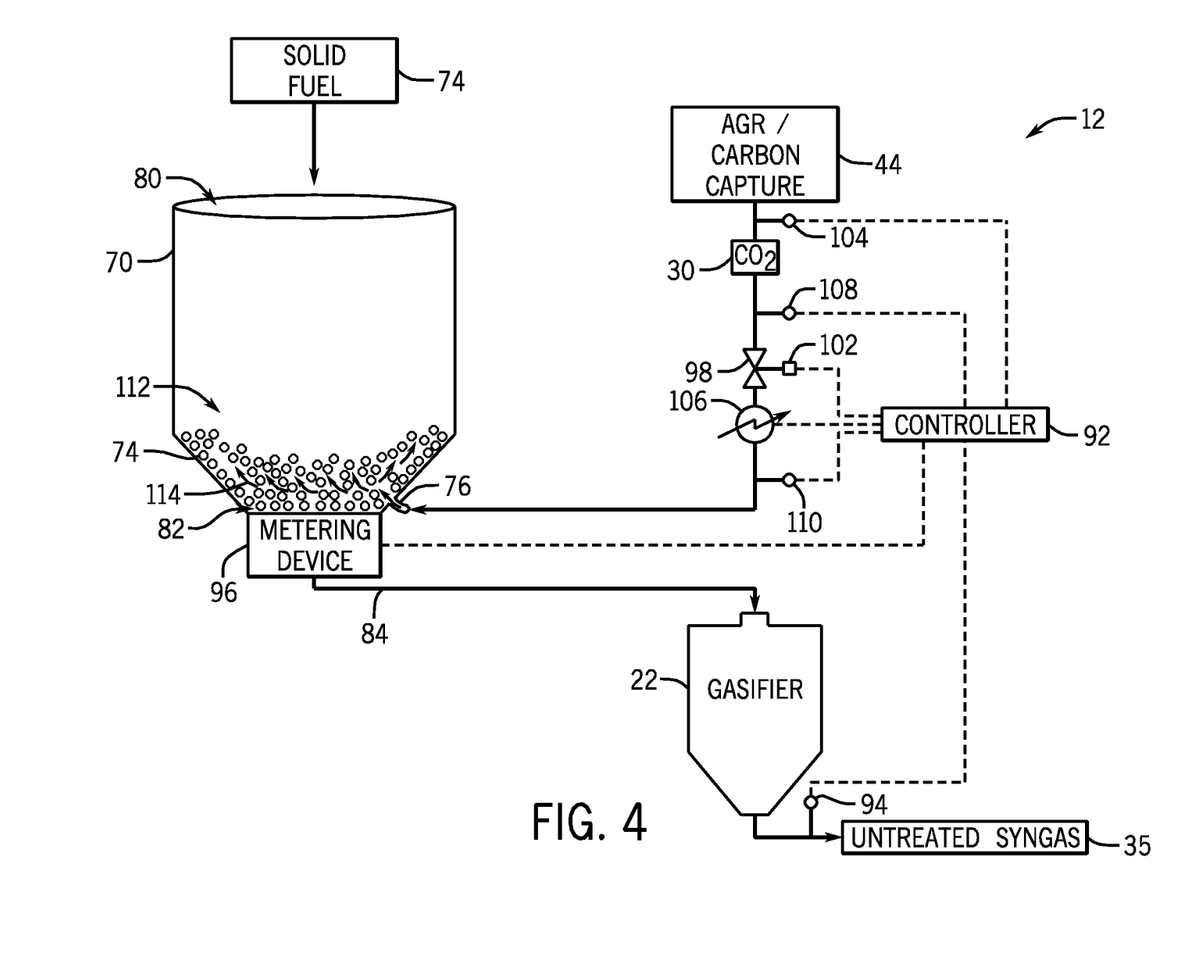
FIG. 4 is a schematic illustration of an embodiment of the feedstock preparation system of FIG. 1 having a gasification feed vessel with a gas inlet configured to receive carbon dioxide from the AGR and carbon capture system of the syngas production system of FIG. 1.

Alternatively or additionally, the flow of gas 78 may include the $CO_2$ 30 removed from the scrubbed syngas 36 at the AGR and carbon capture system 44. However, in certain embodiments, the flow of gas 78 may include $CO_2$ obtained from another source within a gasification system, within a different plant area, or from a $CO_2$-containing vessel configured to store and transport $CO_2$. Indeed, any source of $CO_2$ is presently contemplated. An embodiment of the feedstock preparation system 12 wherein the gasification feed vessel 70 is coupled to the AGR and carbon capture system 44 is illustrated in FIG. 4. As illustrated, the gasification feed vessel 70 is coupled to the AGR and carbon capture system 44 via one or more conduits. As discussed above with respect to FIG. 2, the flow of gas 78, which in the embodiment of FIG. 4 includes $CO_2$ 30, may be heated at the heat exchanger 106. Again, the temperature to which the $CO_2$ 30 is heated may depend on measurements collected by any one or a combination of the sensors 94, 104, 108, 110 and monitored by the controller 92. The controller 92 may make adjustments to the flow rate of the $CO_2$ 30, the temperature of the $CO_2$ 30, the pressure of the $CO_2$ 30, or any combination thereof, in response to the monitored parameters of the system 10 (e.g., feedback from sensors 94, 104, 108, 110). As generally noted above, the $CO_2$ 30 may be heated to facilitate agitation and fluffing of the solid fuel 74 within the gasification feed vessel 70. Again, the feed of the solid fuel 84 may have a uniform energy content and a substantially constant energy concentration as a result of such dry mixing.

As with the nitrogen 24 in FIG. 3, the $CO_2$ 30 may also serve as a carrier gas for the solid fuel 74 in the feed 84. Therefore, the feed of the solid fuel 84 may be a substantially homogeneous and fluidized flow including the solid fuel 74, any additives that may be added to the gasification feed vessel 70 in addition to the solid fuel 74, and the $CO_2$ 30. The $CO_2$ 30, when mixed with the solid fuel 74, may thus serve to provide the feed of the solid fuel 84 at a substantially constant flow rate, a substantially constant energy concentration, an energy concentration maintained within a desired range, or any combination thereof, to the gasifier 22 or another downstream system or process. In certain embodiments, it may be desirable to use $CO_2$ 30 because $CO_2$ is a product gas of the gasification process performed within the gasifier 22 and may be recovered at the AGR and carbon capture system 44. Moreover, $CO_2$ typically has enhanced flame-retarding or combustion-inhibiting qualities compared to other gases, which may aid in preventing combustion from occurring within the gasification feed vessel 70. Indeed, in some embodiments, the flow of gas 78 of FIG. 2 may include a combination of nitrogen 24, $CO_2$ 30, and any other gas suitable for use in accordance with the present approaches. For example, in certain embodiments, gases that may aid in combustion may be included as a small portion of the flow of gas 78. Such combustion-aiding gases may be included in the flow of gas 78 at a partial pressure where combustion is inhibited within the gasification feed vessel 70 by the combustion-inhibiting gases (e.g., $CO_2$, $N_2$, Ar, Ne, or the like). Therefore, the flow of gas 78 may include atmospheric air or oxygen in combination with the combustion-inhibiting gases.

As noted above, in addition to or in lieu of using a flow of gas to enhance and/or promote dry mixing and regular flow, the present embodiments provide the mechanical agitator 72 for dry mixing the solid fuel 74 within the gasification feed vessel 70. FIG. 5 illustrates an embodiment of the feedstock preparation system 12 wherein the gasification feed vessel 70 includes a screw conveyor 120, which facilitates dry mixing and agitation such that the feed of the solid fuel 84 is provided to the gasifier at a substantially constant energy concentration. The screw conveyor 120 includes a central shaft 122 and screw windings 124 disposed on the circumference of the central shaft 122 to form a screw portion 126 of the screw conveyor 120. The screw portion 126 is positioned within an outer sleeve 128 configured to contain the solid fuel 74 that is being conveyed by the screw portion 126. The screw portion 126 is driven by a motor 130, which controls the speed and torque at which the screw portion 126 is able to turn and thus convey the solid fuel 74.

As generally noted above with respect to the mechanical agitator 72 of FIG. 2, the controller 92 is in operative connection with the motor 130, and may control the speed of the motor 130 in response to feedback received from any one or a combination of the sensors 94, 104, 108, 110. As a non-limiting example, an indication that a temperature of the untreated syngas 35 is higher than optimal may cause the controller 92 to increase the speed of the motor 130, such that the screw conveyor 120 more vigorously dry mixes the solid fuel 74. In this way, the likelihood of inconsistent or large variations in the energy concentration of the feed of the solid fuel 84 may be mitigated. The motor 130, as illustrated, is operatively coupled to the central shaft 122 to rotate the screw portion 126 for dry mixing the solid fuel 74.

As illustrated, the solid fuel 74 is both within the outer sleeve 128 of the screw conveyor 120 and outside of the outer sleeve 128 in a moving bed 140. As noted, the moving bed 140 may be fluidized in embodiments where the gasification feed vessel 70 includes the gas inlet 76. The screw conveyor 120 includes a solids inlet 142 configured to receive the solid fuel 74 into the screw conveyor 120 (e.g., within the outer sleeve 128). The screw conveyor 120 may turn in a desired direction so as to lift and mix the solid fuel 74 in a direction 144 toward a solids outlet 146 of the screw conveyor 120. The solid fuel 74 may then exit the screw conveyor 120 and fall toward the solid fuel outlet 82 of the gasification feed vessel 70 in a direction 148. The action of moving the solid fuel 74, conveying the solid fuel 74 in the screw conveyor 120, and maintaining motion of the solid fuel 74 within the gasification feed vessel 70, or any combination thereof, may enable a reduction in variations in the energy concentration of the solid fuel 74 delivered by the gasification feed vessel 70. Further, it should be noted that the screw conveyor 120 may be used in conjunction with an inert gas/flame-retarding gas, such as $N_2$, He, $CO_2$, or the like, to reduce the possibility of combustion or ignition within the gasification feed vessel 70. Indeed, as noted above, with respect to FIG. 2, the screw conveyor, in certain embodiments, may be used in combination with the gas inlet 76 and $CO_2$ 30, N2 24, or any inert or flame-retarding gas generated or otherwise present within the system 10.

While the illustrated embodiment depicts the screw conveyor 120 as conveying the solid fuel 74 in the direction 144, in other embodiments the screw conveyor 120 may convey the solid fuel 74 in the opposite direction, i.e., direction 148 from the solids inlet 80 of the gasification feed vessel 70 to the solids fuel outlet 82. In such embodiments, the solids inlet 142 of the screw conveyor 120 would be disposed on the solid fuel inlet 80 side of the gasification feed vessel 70 and the solids outlet 146 would be disposed proximate the solid fuel outlet 82. In this way, the screw conveyor 120 may control the rate at which the solid fuel 74 is delivered to the metering device 96, adding an increased level of process control. Further, in such embodiments, the moving bed 140 may be disposed closer to the solid fuel inlet 80 of the gasification feed vessel 70 such that the solids inlet 142 of the screw conveyor 120 prevents the solid fuel 74 from reaching the metering device 96 outside of the outer sleeve 128.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:
1. A system, comprising:
 a gasification feed vessel, comprising:
  a solid fuel inlet configured to receive a solid fuel into the gasification feed vessel;
  a dry mixer configured to dry mix the solid fuel within the gasification feed vessel and to form a substantially fluidized flow of the solid fuel, wherein the dry mixer comprises a gas inlet positioned proximate to a bottom of the gasification feed vessel and configured, wherein the gas inlet is configured to receive the stream of gas from a gas source via a conduit to deliver a stream of gas into the gasification feed vessel;
  a solid fuel outlet configured to deliver feed of the substantially fluidized flow of the solid fuel to a gasification system; and
  a solids pump coupled to the solid fuel outlet, wherein the solids pump is configured to control an amount of the feed of the substantially fluidized flow of the solid fuel delivered to the gasification system; a controller operatively connected to the solids pump, wherein the controller is configured to adjust the amount of the feed of the solid fuel in response to feedback received from the gasification system, and is configured to adjust a flow control device disposed along the conduit to control a flow of the stream of gas through the conduit to control the dry mixing of the solid fuel within the gasification feed vessel, and wherein the controller is configured to control the solids pump and the flow control device to provide the feed of the substantially fluidized flow of the solid fuel to the gasification system within a desired energy concentration range over time.

2. The system of claim 1, wherein the gas source comprises an air separation unit (ASU), and the stream of gas comprises nitrogen ($N_2$) separated from air at the ASU.

3. The system of claim 1, wherein the gas source comprises a carbon capture system configured to capture carbon dioxide ($CO_2$) from a syngas produced by the gasification system, and the stream of gas comprises $CO_2$ captured by the carbon capture system.

4. The system of claim 1, comprising the gasification system having a gasifier configured to gasify the solid fuel to produce an untreated syngas, wherein the feedback received from the gasification system comprises a temperature within the gasifier, a temperature of the untreated syngas, an amount of the untreated syngas generated over time, or any combination thereof.

5. The system of claim 1, comprising a drying unit configured to dry the solid fuel before the solid fuel is dry mixed within the gasification feed vessel.

6. The system of claim 1, comprising a drying unit configured to receive the feed of the solid fuel from the gasification feed vessel to dry the solid fuel before the feed of the solid fuel is provided to the gasification system.

7. The system of claim 1, comprising a heat exchanger configured to heat the stream of gas before the stream of gas is delivered to the gasification feed vessel to dry and expand the solid fuel within the gasification feed vessel.

8. A system, comprising:
a gasification feed hopper, comprising:
   a solid fuel inlet configured to receive a solid fuel into the gasification feed hopper;
   a dry mixer configured to dry mix the solid fuel within the gasification feed hopper and to form a substantially fluidized flow of the solid fuel, wherein the dry mixer comprises a gas inlet positioned proximate to a bottom of the gasification feed hopper and configured to deliver a stream of gas into the gasification feed hopper, wherein the gas inlet is positioned downstream of a flow control device configured to adjust an amount of the gas provided to the gasification feed vessel; and
   a solid fuel outlet configured to deliver a feed of the substantially fluidized flow of the solid fuel to a gasification system, wherein the gasification feed hopper comprises a solids pump coupled to the solid fuel outlet and configured to control an amount of the feed of the solid fuel delivered by the gasification feed hopper to the gasification system;
a gasifier of the gasification system configured to receive the feed of the solid fuel and gasify the solid fuel to produce an untreated syngas; and
a controller operatively connected to the solids pump and configured to adjust the amount of the feed of the solid fuel in response to feedback indicative of a temperature within the gasifier, a temperature of the untreated syngas, an amount of untreated syngas generated over time, or any combination thereof, and wherein the controller is configured to control at least the flow control device to enable
the dry mixer is to reduce variations in an energy concentration in the feed of the substantially fluidized flow of the solid fuel provided to the gasification system.

9. The system of claim 8, wherein the gasification feed hopper is configured to provide the feed of the solid fuel to the gasification system at a substantially constant energy concentration over time.

10. A method, comprising:
receiving a solid fuel within an interior of a gasification feed vessel;
dry mixing the solid fuel within the interior of the gasification feed vessel using a stream of gas provided to the interior of the gasification feed vessel, via a gas inlet positioned proximate to a bottom of the gasification feed vessel such that the solid fuel is maintained in a fluidized state within the interior of the gasification feed vessel, wherein the dry mixing is controlled using at least a controller operatively coupled to a flow control device configured to adjust a flow of the stream of gas to the gas inlet; and
delivering, using a solids pump positioned at a solid fuel outlet of the gasification feed vessel, a feed of the solid fuel to a gasification system within a desired energy concentration range over time, wherein the controller controls the operation of the solids pump to control the delivery of the feed of the solid fuel to the gasification system.

* * * * *